(12) United States Patent
Harmon, Sr. et al.

(10) Patent No.: US 8,661,817 B2
(45) Date of Patent: Mar. 4, 2014

(54) HIGH EFFICIENCY DUAL CYCLE INTERNAL COMBUSTION STEAM ENGINE AND METHOD

(75) Inventors: James V. Harmon, Sr., Mahtomedi, MN (US); Jerry A. Peoples, Harvest, AL (US)

(73) Assignee: Thermal Power Recovery LLC, Mahtomedi, MN (US)

( * ) Notice: Subject to any disclaimer, the term of this patent is extended or adjusted under 35 U.S.C. 154(b) by 593 days.

(21) Appl. No.: 12/844,607

(22) Filed: Jul. 27, 2010

(65) Prior Publication Data

US 2010/0300100 A1  Dec. 2, 2010

Related U.S. Application Data

(63) Continuation-in-part of application No. 12/539,987, filed on Aug. 12, 2009, now Pat. No. 8,061,140, which is a continuation-in-part of application No.

(Continued)

(51) Int. Cl.
*F02G 3/00* (2006.01)
(52) U.S. Cl.
USPC ............ 60/616; 60/615; 123/41.2; 123/41.72
(58) Field of Classification Search
USPC .................. 60/614, 618, 624, 670, 615, 616; 123/41.2, 41.72
See application file for complete search history.

(56) References Cited

U.S. PATENT DOCUMENTS

| | | | |
|---|---|---|---|
| 51,081 | A | 11/1865 | Pike |
| 175,485 | A | 3/1876 | Miracle |

(Continued)

FOREIGN PATENT DOCUMENTS

| | | |
|---|---|---|
| DE | 3437151 A1 | 4/1986 |
| GB | 1750 | 0/1912 |

(Continued)

OTHER PUBLICATIONS

Evans Cooling Systems, Evans Waterless Engine Coolant, by Evans Cooling Systems, Suffield, CT 06078; website information www.evanscooling.com/fuel-efficiency/, pp. 1-6.

(Continued)

*Primary Examiner* — Kenneth Bomberg
*Assistant Examiner* — Paolo Isada
(74) *Attorney, Agent, or Firm* — Nikolai & Mersereau, P.A.; James V. Harmon

(57) ABSTRACT

The coolant in the cooling jacket of a dual cycle internal combustion steam engine is intentionally maintained at an elevated temperature that may typically range from about 225° F.-300° F. or more. A non-aqueous liquid coolant is used to cool the combustion chamber together with a provision for controlling the flow rate and residence time of the coolant within the cooling jacket to maintain the temperature of the coolant at a selected elevated temperature that is substantially above the boiling point of water but below the boiling point of the coolant. The coolant is passed from the jacket through a heat exchanger in a first circuit to transfer heat to a vaporizable working fluid such as water and is then returned. An optional second circuit is an intrajacket perturbation circuit within the engine can be used to disrupt and disperse pockets of vapor that may tend to form before damaging hot spots can develop around the combustion chamber. A cooling jacket design is tailored to extract heat at the highest possible temperature from each heat transfer zone as by having the coolant follow a circuitous helical pathway to achieve more efficient and improved heat transfer from the combustion chamber to the cooling medium.

28 Claims, 4 Drawing Sheets

Related U.S. Application Data

(63) 12/492,773, filed on Jun. 26, 2009, now abandoned, which is a continuation-in-part of application No. 12/387,113, filed on Apr. 28, 2009, now Pat. No. 8,109,097, which is a continuation-in-part of application No. 12/075,042, filed on Mar. 7, 2008, now Pat. No. 7,997,080.

(60) Provisional application No. 61/228,752, filed on Jul. 27, 2009, provisional application No. 61/320,959, filed on Apr. 5, 2010, provisional application No. 61/309,640, filed on Mar. 2, 2010, provisional application No. 60/905,732, filed on Mar. 7, 2007, provisional application No. 61/192,254, filed on Sep. 17, 2008, provisional application No. 61/194,608, filed on Sep. 29, 2008.

(56) References Cited

U.S. PATENT DOCUMENTS

| | | |
|---|---|---|
| 606,739 A | 7/1898 | Rothgery |
| 753,647 A | 3/1904 | Thorson |
| 845,622 A | 2/1907 | Du Shane |
| 1,027,380 A | 5/1912 | Fryer |
| 1,128,125 A | 2/1915 | Fryer |
| 1,169,672 A | 1/1916 | Palm |
| 1,252,927 A | 1/1918 | Muir |
| 1,311,529 A | 7/1919 | Muir |
| 1,324,183 A * | 12/1919 | Still .................................. 60/618 |
| 1,331,665 A | 2/1920 | Ohborg |
| 1,332,633 A | 3/1920 | Parrish |
| 1,359,988 A | 11/1920 | Hansen |
| 1,427,395 A | 8/1922 | Kaschtofsky |
| 1,489,291 A | 4/1924 | Tuerk |
| 1,496,839 A | 6/1924 | Bohan et al. |
| 1,502,918 A | 7/1924 | Scott |
| 1,517,372 A | 12/1924 | Martineau |
| 1,542,578 A | 6/1925 | Pool |
| 1,601,995 A | 10/1926 | Butler et al. |
| 1,629,677 A | 5/1927 | Bull |
| 1,630,841 A | 5/1927 | Fusch |
| 1,732,011 A | 10/1929 | Gouirand |
| 1,802,828 A | 4/1931 | Perrenoud |
| 1,913,251 A | 6/1933 | Smith |
| 2,000,108 A | 5/1935 | Tucker |
| 2,040,453 A | 5/1936 | Weber |
| 2,057,075 A | 10/1936 | Wuehr |
| 2,063,970 A | 12/1936 | Young |
| 2,122,521 A | 7/1938 | Goddard |
| 2,138,351 A | 11/1938 | McGonigall |
| 2,341,348 A | 3/1940 | Welby |
| 2,196,979 A | 4/1940 | Campbell |
| 2,196,980 A | 4/1940 | Campbell |
| 2,402,699 A | 6/1946 | Williams |
| 2,560,449 A | 7/1951 | Kahr |
| 2,604,079 A | 7/1952 | Ray |
| 2,649,082 A | 8/1953 | Harbert et al. |
| 2,943,608 A | 7/1960 | Williams |
| 3,200,798 A | 8/1965 | Mansfield |
| 3,397,619 A | 8/1968 | Sturtevant |
| 3,650,295 A | 3/1972 | Smith |
| 3,882,833 A | 5/1975 | Longstaff |
| 3,908,686 A | 9/1975 | Carter et al. |
| 3,921,404 A * | 11/1975 | Mason ............................ 60/618 |
| 3,995,531 A * | 12/1976 | Zibrun ............................ 91/152 |
| 4,023,537 A | 5/1977 | Carter, Sr. et al. |
| 4,050,357 A | 9/1977 | Carter, Sr. et al. |
| 4,077,214 A | 3/1978 | Burke, Jr. |
| 4,087,974 A | 5/1978 | Vaughan |
| 4,201,058 A | 5/1980 | Vaughan |
| 4,300,353 A | 11/1981 | Ridgway |
| 4,352,342 A | 10/1982 | Cser et al. |
| 4,362,132 A | 12/1982 | Neuman |
| 4,377,934 A * | 3/1983 | Marshall ........................ 60/712 |
| 4,433,548 A * | 2/1984 | Hallstrom, Jr. ................. 60/712 |
| 4,509,464 A | 4/1985 | Hansen |
| 4,550,694 A | 11/1985 | Evans |
| 4,561,256 A | 12/1985 | Molignoni |
| 4,565,162 A * | 1/1986 | Seki et al. .................. 123/41.08 |
| 4,590,766 A | 5/1986 | Striebich |
| 4,599,859 A * | 7/1986 | Urso .............................. 60/514 |
| 4,622,925 A * | 11/1986 | Kubozuka .................. 123/41.25 |
| 4,706,462 A | 11/1987 | Soltermack |
| 4,724,800 A | 2/1988 | Wood |
| 4,747,271 A | 5/1988 | Fischer |
| 4,785,631 A | 11/1988 | Striebich |
| 4,803,958 A * | 2/1989 | Erickson ........................ 122/21 |
| 4,829,947 A | 5/1989 | Lequesne |
| 4,864,826 A | 9/1989 | Lagow |
| 5,000,003 A | 3/1991 | Wicks |
| 5,031,579 A * | 7/1991 | Evans ........................... 123/41.2 |
| 5,111,776 A | 5/1992 | Matsushiro et al. |
| 5,121,607 A | 6/1992 | George, Jr. |
| 5,255,636 A * | 10/1993 | Evans ........................ 123/41.54 |
| 5,385,211 A | 1/1995 | Carroll |
| 5,845,609 A * | 12/1998 | Corrigan .................... 122/209.1 |
| 6,220,210 B1 | 4/2001 | Kobayashi |
| 6,237,550 B1 | 5/2001 | Hatano |
| 6,247,309 B1 * | 6/2001 | Haas et al. ...................... 60/514 |
| 6,443,111 B1 | 9/2002 | LaDow |
| 6,470,679 B1 | 10/2002 | Ertle |
| 6,694,737 B2 | 2/2004 | Tsai et al. |
| 6,834,503 B2 | 12/2004 | Freymann |
| 6,895,756 B2 | 5/2005 | Schmotolocha |
| 7,056,251 B2 | 6/2006 | Ibaraki |
| 7,104,063 B2 | 9/2006 | Clemens |
| 7,191,649 B1 | 3/2007 | Coogle |
| 7,240,644 B1 * | 7/2007 | Slike et al. ............. 123/41.82 R |
| 7,367,306 B1 * | 5/2008 | Holden ......................... 123/250 |
| 7,421,983 B1 * | 9/2008 | Taylor ........................ 123/41.01 |
| 7,454,910 B2 | 11/2008 | Hamada et al. |
| 7,454,911 B2 | 11/2008 | Tafas |
| 7,841,309 B2 | 11/2010 | Grundl |
| 7,997,080 B2 * | 8/2011 | Harmon et al. ................. 60/670 |
| 8,061,140 B2 * | 11/2011 | Harmon, Sr. ................... 60/670 |
| 8,109,097 B2 * | 2/2012 | Harmon et al. ................. 60/670 |
| 2005/0235931 A1 * | 10/2005 | Zahdeh ....................... 123/41.74 |
| 2006/0107663 A1 * | 5/2006 | Filippone ........................ 60/643 |
| 2008/0216480 A1 * | 9/2008 | Harmon et al. ................. 60/670 |
| 2009/0205338 A1 | 8/2009 | Harmon |
| 2009/0293480 A1 | 12/2009 | Harmon |
| 2011/0083434 A1 * | 4/2011 | Peoples et al. .................. 60/618 |

FOREIGN PATENT DOCUMENTS

| | | |
|---|---|---|
| GB | 25356 | 0/1911 |
| GB | 28472 | 0/1913 |
| GB | 125395 | 4/1918 |
| GB | 130621 | 8/1919 |
| JP | 2008121615 | 5/2008 |
| JP | 2008240614 | 10/2008 |
| JP | 200997391 | 5/2009 |
| WO | WO 0231319 | 4/2002 |
| WO | WO 03050402 | 6/2003 |

OTHER PUBLICATIONS

J.R. Allen and J.A. Bursley, Heat Engines, 1925 Third Edition, pp. 210 and 211, McGraw Hill, New York, U.S.

Jerry Peoples, Gewgaws of Production Steam, The Steam Automobile Bulletin, Sep.-Oct. 2006, vol. 20, No. 5, pp. 7-13.

J.V. Haywood, Internal Combustion Engines, McGraw-Hill Book Co. 1988 pp. 657-659.

D.A. Low, Heat Engines, Longmans, Green & Co. 1949, pp. 246-248.

Marks, et. al., Marks' Standard Handbook for Mechanical Engineers, McGraw-Hill, Inc. 9th ed. 1987, pp. 9-36 to 9-38.

An Assessment of the Technology of Rankine Engines for Automobiles. Division of Transportation Energy Conservation, U.S. Energy Research and Development Administration, Apr. 1977, pp. 22-24.

Bill Cartland, Easy Starting Bash Valve, Steam Automobile Club of America, Inc. Technical Report No. 120, 1993, one page.

(56) References Cited

OTHER PUBLICATIONS

Ronald Loving, Low NOx Thermal Oxidizers, Steam Automobile Bulletin, vol. 20 No. 5, Sep.-Oct. 2006, pp. 28-30.

Tom Kimmel, The Leslie Engine, Steam Automobile Bulletin, vol. 21 No. 5, Sep.-Oct. 2007, pp. 14-16.

D.A. Arias, et. al., Theoretical Analysis of Waste Heat Recovery From and Internal Combustion Engine in a Hybrid Vehicle, SAE Technical Paper, 2006-01-1605, Apr. 3-6, 2006.

S.S. Miner, Developments in Automotive Steam Power Plants, SAE Technical Paper, No. 690043, Jan. 13-17, 1969.

BMW's Hybrid Vision: Gasoline and Steam, Popular Science Magazine, Mar. 2006, p. 22 (one page).

An Assessment of the Technology of Rankine Engines for Automobiles Div. of Transportation Energy Conservation, U. S. Energy Research & Develop. Admin., Apr. 1977, pp. 43-54.

Ho-Young Kim, Yi Gu Kim, and Byung Ha Kang, Enhancement of Natural Convection and Pool Boiling Heat Transfer Via Ultrasonic Vibration, International Journal of Heat and Mass Transfer, vol. 47, Issued Jun. 2004, pp. 28, 31-28-40.

Kwon; Kwon; Jeong and Lee, Experimental Study on CHF Enhancement in Pool Boiling Using Ultrasonic Field, J. Ind. Eng. Chem., vol. 11, No. 5, 2005, 631-637.

Pang and Brace, Review of Engine Cooling Technologies for Modern Engines, Proc. Instn. Mech. Engrs., vol. 218, Part D: J. Automobile Engineering, pp. 1209-1215.

\* cited by examiner

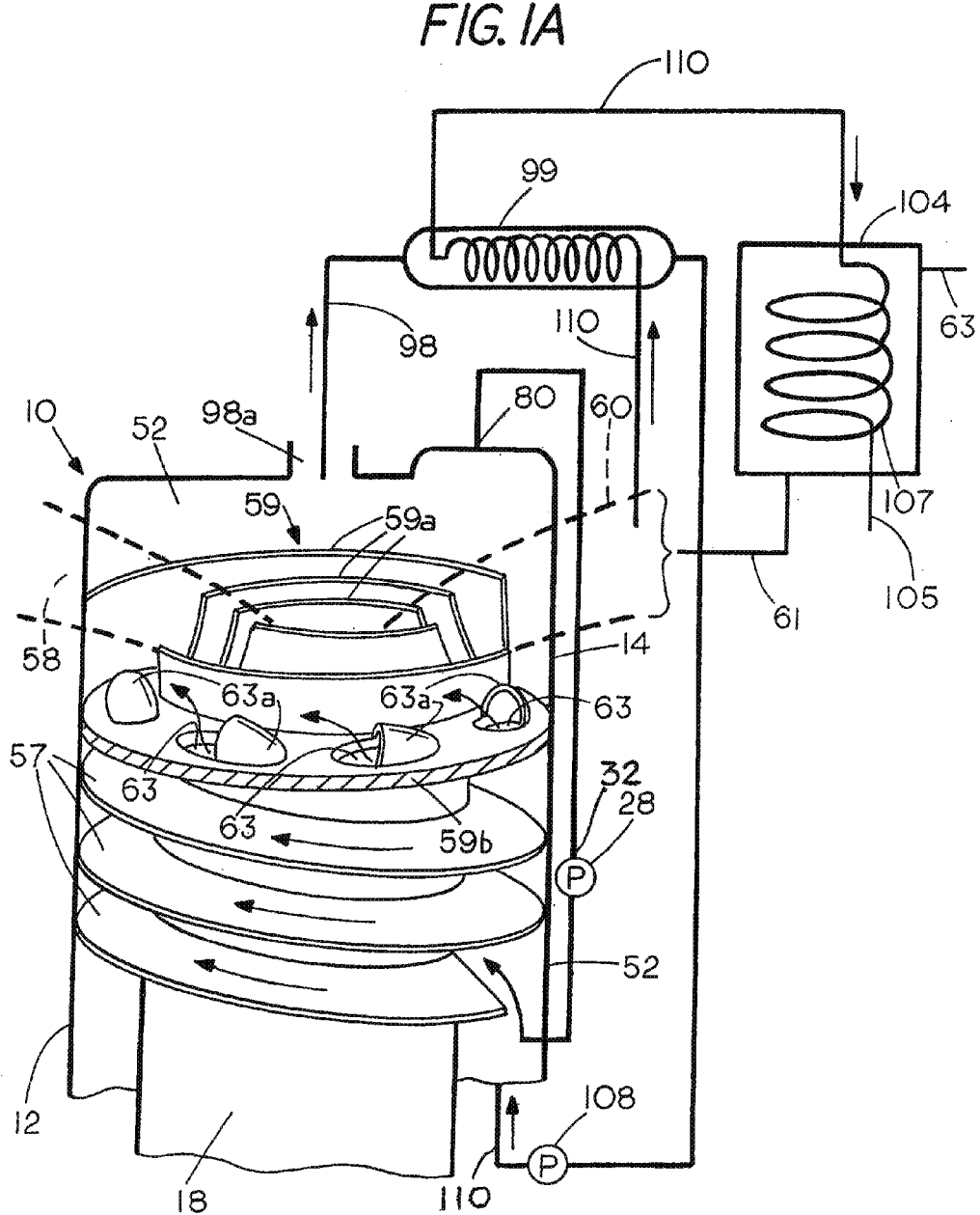

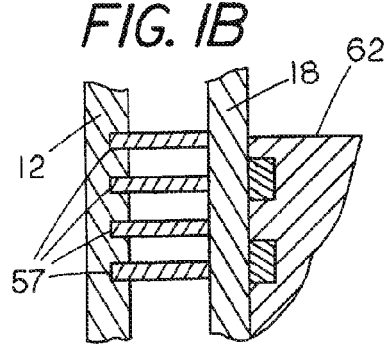
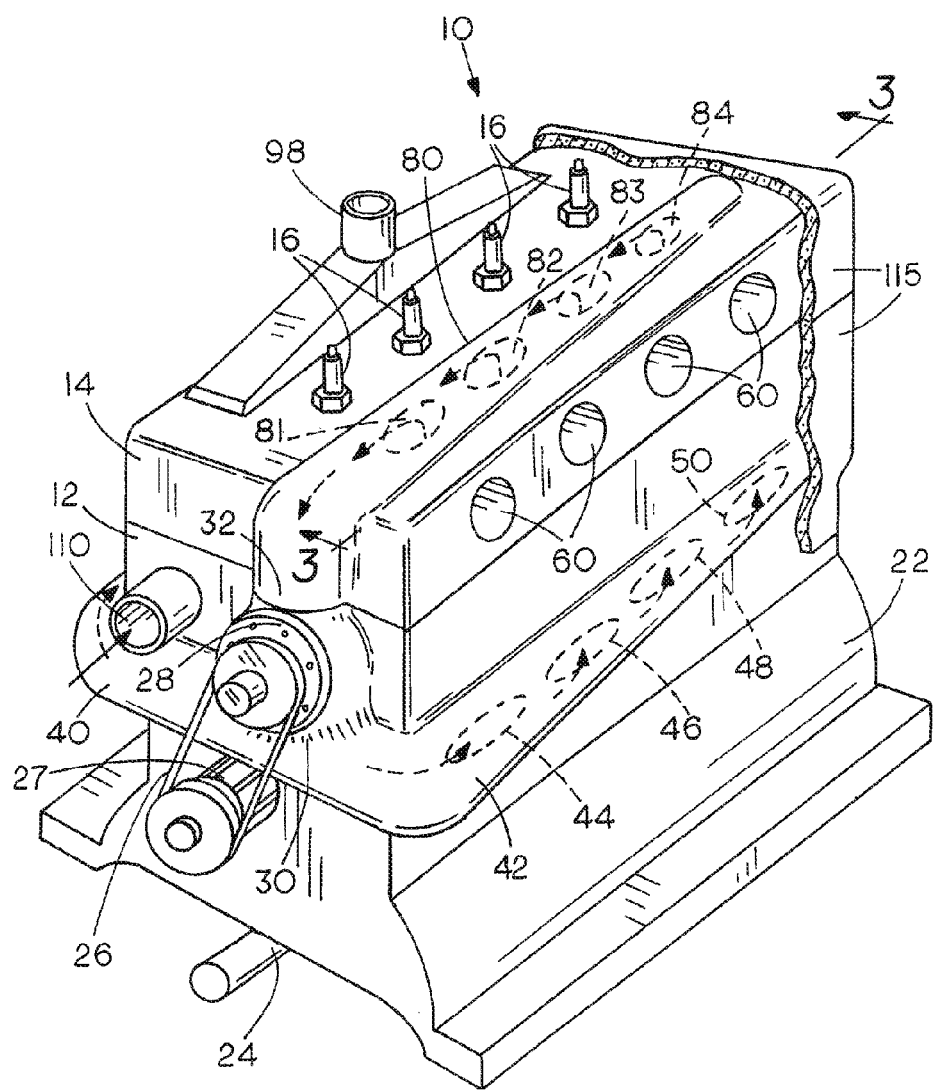

HIGH EFFICIENCY DUAL CYCLE INTERNAL COMBUSTION STEAM ENGINE AND METHOD

This application is a continuation-in-part of Ser. No. 12/539,987, filed Aug. 12, 2009, which is a continuation-in-part of Ser. No. 12/492,773, filed Jun. 26, 2009 (abandoned) which is a continuation-in-part of Ser. No. 12/387,113, filed Apr. 28, 2009, which is a continuation-in-part of Ser. No. 12/075,042, filed Mar. 7, 2008

The applicant claims the benefit of pending provisional application Ser. No. 61/228,752, filed Jul. 27, 2009; Ser. No. 60/905,732, filed Mar. 7, 2007; Ser. No. 61/192,254, filed Sep. 17, 2008; Ser. No. 61/320,959, filed Apr. 10, 2010; Ser. No. 61/194,608, filed Sep. 29, 2008; and Ser. No. 61/309,640, filed Mar. 2, 2010.

BACKGROUND OF THE INVENTION

This invention relates to dual cycle engines, and more particularly to a dual cycle internal combustion piston engine and method wherein engine coolant and exhaust gases are used to produce steam that is applied to the piston for recovering waste combustion heat.

While the internal combustion engine is depended upon for most land transportation throughout the world, it loses about 72%-75% of the fuel heating value through radiation, engine coolant and exhaust. In one car that was tested, the measured brake horsepower was only 21% of the fuel heating value at 72 mph and only 18% at 43 mph. Meanwhile, increasing fuel prices and shortages mount steadily as world supplies of fossil fuel decline and greenhouse gas emissions continue to rise. The Rankine cycle has been used to recover waste heat from internal combustion engines, but power recovery has been inefficient and has suffered from various other shortcomings. For example, it has been proposed to use coolant heat to power a separate steam turbine which is connected to the crankshaft of the engine. However, steam turbines have not proved efficient in units under 500 HP, have had gear box problems and cannot accelerate rapidly thus making them impractical for use in vehicles such as cars and trucks. Within the engine itself, cooling problems can be caused by an inability to provide coolant capable of robust heat transfer to the feed water or by steam generation hot spots, which may result in an uncontrolled heating condition in certain parts of the engine due to what is known as transition film boiling, a form of runaway heating that follows nucleate boiling often leading to damage from pre-ignition or detonation in the combustion chamber. Consequently, successful waste heat recovery in an IC engine presents unique problems especially if high fuel efficiency is to be achieved together with reliable operation in which there is little likelihood of a burnout or detonation in the combustion chamber. It is, therefore, a general object of this invention to provide an improved dual cycle internal combustion steam engine that is both efficient with respect to the fraction of waste heat that is recovered as well as being reliable in operation.

These and other more detailed and specific object and advantages of the present invention will be better understood by reference to the following figures and detailed description which illustrate by way of example but a few of the various forms of the invention within the scope of the appended claims.

THE DRAWINGS

FIG. 1A is a partial diagrammatic perspective view showing the helical path taken by the coolant.

FIG. 1B is a partial vertical sectional view showing a small section of the helical coolant pathway of FIG. 1A on a larger scale.

FIG. 2 is a perspective view of an engine embodying the invention.

SUMMARY OF THE INVENTION

In accordance with the invention, the coolant in the cooling jacket of a dual cycle internal combustion steam engine is intentionally maintained at an elevated temperature preferably of at least about 225° F. but which typically range from about 240° F.-300° F. or more. Most preferably, a non-aqueous liquid coolant is used together with a provision for controlling the flow rate and residence time of the coolant within the cooling jacket to maintain the temperature of the coolant at a selected elevated temperature that is substantially above the boiling point of water, but below the boiling point of the coolant. The non-aqueous liquid coolant having a boiling point above 212° F. and more preferably above 225° F. serves as a thermal interface between two thermodynamic cycles of energy conversion, e.g., either diesel or Otto cycle and a Rankine cycle. Through the operation of these provisions working together in a coordinated manner as will be described, a much greater fraction of the unused thermal energy can be recovered than would otherwise be possible. More specifically, the invention enables a much greater amount of the coolant heat to be transferred to a steam expander that is provided as a part of an internal combustion piston engine.

The invention also takes advantage of the differential cylinder temperature distribution that occurs as a result of the combustion and gas expansion. The greater wall and head temperatures peculiar to combustion are located near the top one-third of the cylinder, whereas the lower temperatures associated with gas expansion are located in the bottom two-thirds of the cylinder. The present invention provides a cooling jacket design that is tailored to extract heat at the highest possible temperature from each heat transfer zone most preferably by having the coolant follow a circuitous pathway of a selected configuration that will be described to achieve more efficient and improved heat transfer from the combustion chamber to the cooling medium and, hence, greater heat transfer to a vaporizable working fluid used in the steam expander.

DETAILED DESCRIPTION OF THE PREFERRED EMBODIMENTS

Figure 3:
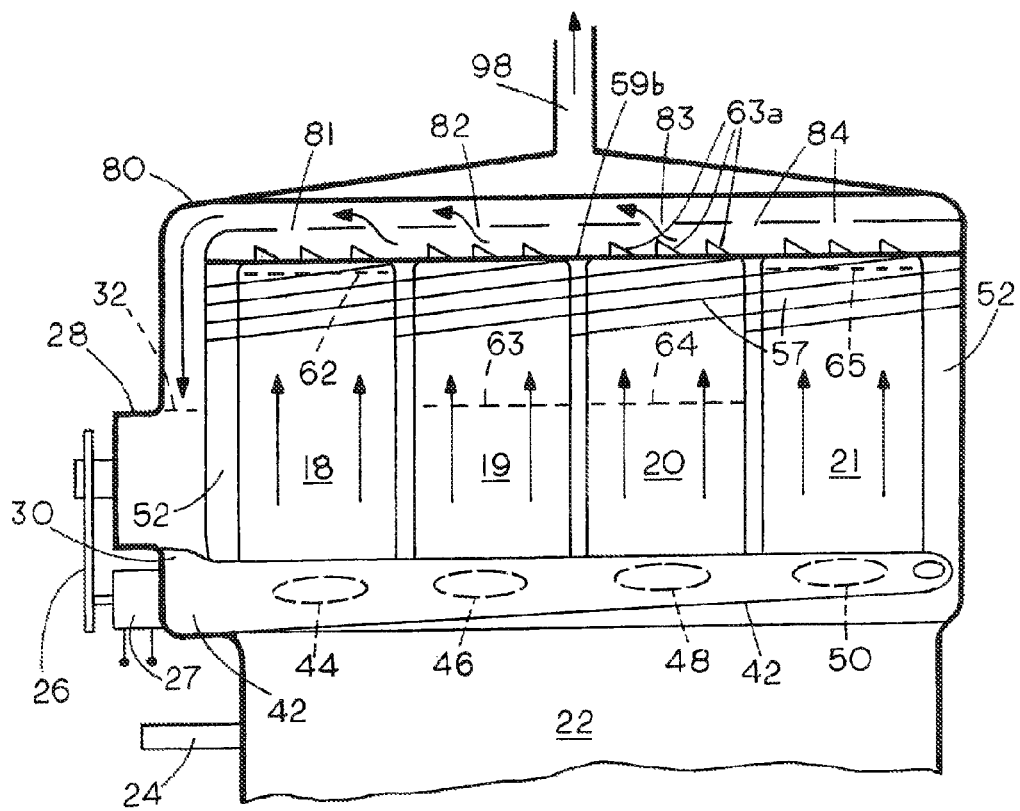
FIG. 3 is a diagrammatic vertical sectional view of the engine shown in FIGS. 1 and 2 taken on line 3-3 of FIG. 2.

With reference to the figures, the numeral 10 designates a high efficiency internal combustion dual cycle piston engine having an integral steam expander comprising steam expansion chamber 70 and in a preferred form a high positive-flow intrajacket coolant circulation which will now be described. To illustrate a typical example of the invention, a 4 cylinder automobile engine is shown having an engine block 12 with a cylinder head 14, sparkplugs 16 (FIG. 2) operating as a spark ignition gasoline engine including cylinders 18, 19, 20, and 21 (FIG. 3) with a cooling jacket 52 in which the temperature of the coolant 36 (FIG. 4) is purposely elevated to a selected level. The engine crankcase shown at 22 has a crankshaft 24 which is suitably coupled by connecting rods 66 to pistons 62-65 (FIG. 3). A perturbating device comprising an intrajacket coolant recirculation pump 28 is driven by a variable speed electric motor 27 and belt drive 26 to maintain a selected flow rate through the cylinder and the head 14 as well as to help reduce or prevent transition film boiling. The recirculation pump 28 has an inlet at 32 and an outlet at 30 for pumping a coolant liquid 36.

It will be apparent that pump 28 can, if desired, maintain internal flow rates that are higher than an external rate of flow, i.e., that outside the cooling jacket. The pump 28 is shown partially recessed within the engine block 12 (FIG. 2). While it is preferred that the entire pump 28 be in heat transfer relationship as shown with the cooling jacket 52, it can of course be separate from the engine block if desired. It can be seen that the outlet 30 of the pump 28 is connected to two intrajacket recirculation ducts comprising manifolds 40 and 42. The engine is seen from the front in FIG. 2 with manifold 40 on the left side and manifold 42 on the right, each supplying coolant to horizontally distributed openings 44-50 on each side of the engine, only those on the right being visible in FIGS. 2 & 3. While four main openings have been shown, obviously any number can be provided. Each of the openings 44-50 communicates with the interior of an engine cooling jacket 52 that removes heat from a combustion chamber 54 which itself is generally conventional in construction having at its upper end an inlet valve 56 controlling the flow of air and fuel in through combustion air inlet 58 and an exhaust valve 56a which controls the flow of the exhaust and combustion products out through the exhaust port 60. The engine 10 can be a 4 stroke spark ignition engine, a diesel engine or if desired, a two-stroke cycle engine, Atkinson or other cycle engine. Valves 56 and 56a are actuated conventionally.

Figure 1:
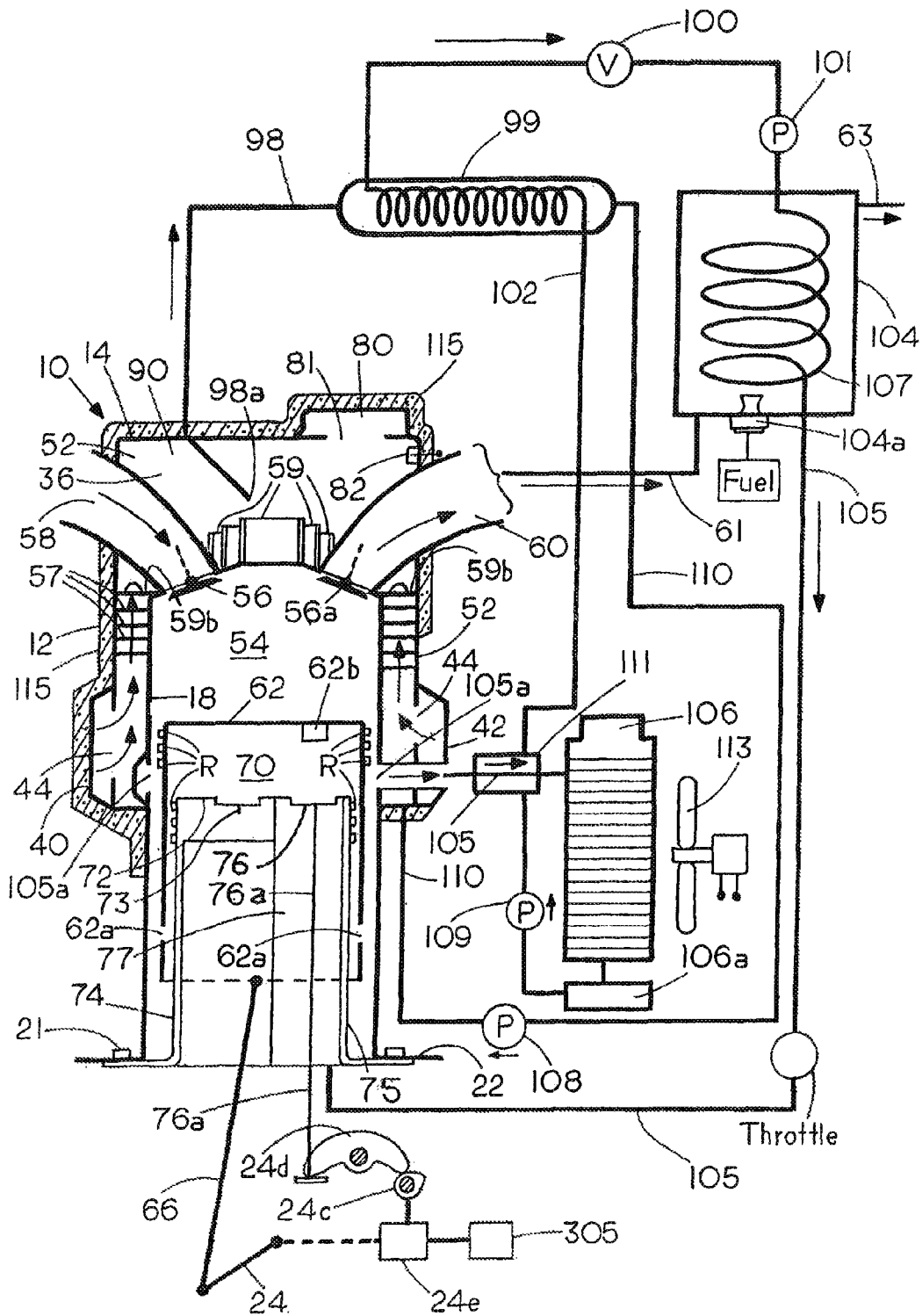
FIG. 1 is a diagrammatic vertical sectional view of an engine embodying the invention taken through one of the cylinders and includes a schematic circuit diagram showing the flow of coolant liquid as well as a heat exchange medium that also serves as a working fluid in a steam expander.

The pistons 62-65 (FIG. 3) only one of which is shown in FIG. 1 are each connected by means of a connecting rod 66 to the crankshaft 24 as described more fully in copending application Ser. No. 12/492,773 filed Jun. 26, 2009 which is incorporated herein by reference. Sealing rings, i.e., compression rings R are shown between the piston and cylinder as well as between the piston and cap 20 such that the piston 62 is slidably and sealingly mounted with respect to both the cylinder 18 and a fixed steam cylinder head or cap 72. The piston 62 and cap 72 can be as disclosed in copending application Ser. Nos. 12/075,042, 12/387,113, and 12/539,987 which are incorporated herein by reference. During operation, steam is exhausted when port openings 62a in the piston skirt come into alignment with an exhaust port 105a in the cylinder 18 as described in the aforesaid copending applications.

The engine is a double acting engine with a steam expansion chamber 70 located inside the piston between the piston 62 and a cylinder cap 72 that comprises the lower or steam cylinder head. The cap 72 has a pair of laterally spaced apart legs 74 and 75 which serve as supports that are rigidly secured to the crankcase 22 by bolts 21 as described in application Ser. No. 12/539,987. In operation, steam is admitted to the steam expansion chamber 70 from a high pressure steam supply line 105 by a steam admission valve 76 that can be opened by a valve lifter 62b on the lower, i.e. inward, wall of piston 62 or alternatively by a cam and camshaft 24c coupled by a valve rocker 24d to valve stem 76a. The phase of the camshaft 24c and the resulting cutoff of steam as a fraction of the stroke of piston 62 can be regulated by a controller, e.g. an electronic engine management computer 305 and phase change gear box 24e as described in the pending application Ser. No. 12/387,113. Phase change can be accomplished either mechanically or electronically.

The expander comprising the expansion space 70 for steam within the piston 62 can be operated in either of two modes; first, a high pressure recompression mode as described in pending application Ser. Nos. 12/387,113 and 12/075,042 in which residual steam is recompressed during the return stroke of the piston following the exhaust phase blow down which occurs at the top center position so that the pressure is raised during recompression to the admission pressure or above. Then, when the steam admission valve is opened, the steam does not have to fill an empty space since the clearance volume is already filled with high pressure steam. If desired, the final recompression pressure can be regulated by providing a steam recompression delay valve 73, the phase of which is controlled either electronically or mechanically to regulate the point in the cycle when it closes to thereby control the fraction of the stroke during which recompression occurs and in turn the final recompression pressure.

In a second alternative operating mode described in pending provisional application 61/320,959, dated Apr. 5, 2010, instead of recompressing residual steam, the residual steam is allowed to escape through an exhaust valve that closes at the end of the exhaust stroke so as to provide a zero steam pressure condition. Also, instead of providing a significant clearance space in the usual way, the piston is set to come virtually within a microscopic clearance, e.g. 0.020 inch; or other miniscule clearance from the head which is just sufficient to prevent thermal expansion from enabling the piston to strike the head, thereby providing in effect, a zero clearance zero compression operation as described in provisional application 61/320,959.

Near the top of each cylinder is a helical flow guide 57 formed from a spiral metal flange or sheet such as a sheet of heat insulating material, for example, fiberglass within jacket 52 (FIGS. 1A and 1B), which causes the coolant to take a helical pathway that enhances heat transfer to the coolant at the location of the hottest wall area of the combustion chamber. If the flow guide 57 is metal, it can be cast or machined into the cylinder wall 18 to promote heat transfer to the coolant albeit with greater axial heat losses than fiberglass. A similar scroll-shaped guide 59 is provided on the top of the lower wall of the head jacket to guide the coolant within the head 14 in a circular pathway as shown across the top of the combustion chamber. Coolant enters the head through openings 63, each with a flow guide 63a to maintain a circular flow. The outlet 98a from the head to line 98 can be tangential to further promote the circular flow of coolant in the head 14 and can be positioned as shown in FIG. 1 to pick up coolant where it is at the highest temperature.

It will be seen that the coolant enters cooling jacket 52 at or near the bottom of the cylinder, then travels upwardly freely along approximately the lower two-thirds of each of the cylinders from openings 44-50 on both sides and without being constrained to a particular course. However, in approximately the top one-third of the cylinder, the coolant passes between successive spiral separator elements 57 and is in that way is forced to follow the helical pathway and at a more rapid flow rate than occurs in the lower two-thirds of the cylinder where the flow is not channeled. Once the coolant reaches the top of the cylinder, it passes into the cylinder head 14 through openings 63 and is then directed to follow a swirling or circular path by the use of the flow guides 63a and scroll 59 which can be formed as a part of the metal casting of which the head is composed. The scroll flanges 59a (FIG. 1A) which are integral with the lower wall 59b of the cylinder head also enhance heat transfer to the coolant through conduction. It will be noticed that by directing the flow from the cooler regions at the bottom of the cylinder and out through the top of the head after passing the flow guides 57, 59 and 63a the coolant will be exposed to the highest temperatures just before exiting through head outlet pipe 98 thereby maximizing the coolant efflux temperature. With a greater wall temperature distribution in the top one-third of the cylinder and head, recovery of a large portion of the waste heat at a higher temperature becomes possible. This believed to be due to the greater heat transfer coefficient associated with a greater mass flux, i.e., mass velocity, achieved by the present invention. In the bottom two-thirds of the cylinder, the longer residence time within the jacket as a result of the reduced flow, accommodates more heat recovery than would otherwise occur. The rapid flow through the spiral pathway between the spiral separator elements 57 in this way creates a helical flow channel that achieves more efficient heating and greater mass velocity, thus increasing the overall heat transfer coefficient.

Provided as a part of the cylinder head 14 is another coolant manifold 80 which is connected to the inlet 32 of the pump 28 for feeding coolant to the pump 28 from several, in this case four openings 81-84 in the top of engine cooling jacket 52. It can be seen clearly that the manifolds 40, 42 and 80 are built into the engine block or the head 14 by being integral with the outer wall of the block or the head in the case of the manifold 80. To provide the integral construction, the three manifolds as well as the openings, leading between the manifolds and the cooling jacket 52 and pump 28 are preferably cast into the engine block and head 14 during manufacture. This not only reduces the cost of the manifolding, it also places the manifolds 40, 42, and 80 in heat transfer relationship with the coolant inside the jacket 52, thus minimizing heat losses by keeping the coolant within the manifolds at substantially the same temperature as when it passes out of the cooling jacket 52 through the openings 81-84. For the same reason, the housing of pump 28 can be cast so as to be integral in part with the engine block 12.

The pump 28 is driven by a variable speed electric motor 27 connected to electronic central management computer 305 as an engine controller to regulate the coolant flow rate inside the engine continuously during operation or, in the alternative, a thermostatic coolant valve (not shown) is connected to the computer to control coolant flow. A commercially available pressure pulse sensor for liquids 82 in jacket 52 is connected to the computer controller 305 to sense when coolant boiling is about to begin for speeding up pumps 28 and 108 and/or opening thermostatic valves (not shown) to lower the coolant temperature sufficiently to prevent transition film boiling.

The level of the coolant 36 is kept above the top of the manifold 80 and can fill the entire jacket 52 as at 90 in FIG. 1. During normal running of the engine, pipe 98 carries the coolant from jacket 52 into countercurrent heat exchanger 99. Pipe 110 and pump 108 then returns it back into cooling jacket 52. In a separate circuit, a vaporizable working fluid, such as water or water and ethylene glycol or other suitable known vaporizable aqueous or organic working fluid flows from heat exchanger 99 through valve 100 to a pressurizing pump 101 then to steam generator 104 which functions as a superheater that is fired by combustion exhaust gas discharged from the combustion exhaust ports 60 through an inlet pipe 61 into steam generator 104 and exits through exhaust pipe 63 after superheating steam which flows in the opposite direction through coils 107. The term "steam" herein is used broadly to include vapor from water as well as organic fluids or other working fluid. The steam generator 104 can comprise an enlarged engine exhaust manifold for superheating the steam as described in the aforementioned copending applications. In this way, the coolant 36 at a temperature far above the boiling point of water serves as a thermal interface between two different thermodynamic cycles of energy conversion for example between the Otto cycle and the Rankine cycle or between the diesel cycle and the Rankine cycle. In one form of the invention (FIG. 1), a fuel burner of suitable known construction 104a is provided at one end of the steam generator 104 for producing supplemental heat on a standby basis, for example, when maximum power is needed to pass a vehicle or climb a steep hill. The burner 104a thus provides a portion of the Rankine thermal energy input from a source that is external to the heat energy from the Otto cycle or Diesel cycle.

From the generator 104, steam then passes through a high pressure supply line 105 to a duct 77 below the cylinder cap 72 and is admitted into the steam expansion chamber 70 during operation under the control of the steam admission valve 76. The piston 62 is sealed in sliding relationship both with the cylinder cap 72 and with the inner wall of the cylinder 18 by piston rings R (FIG. 1) as described in the applications noted earlier. When valves 105a open through alignment with ports 62a, spent steam passes through a manifold surrounding cylinder 18 into line 105 to a condenser 106 from which steam condensate held in a tank 106a is transferred by a pump 109 to a counter current heat exchanger 111 that functions as recuperator then back to valve 100 through the heat exchanger 99 in a closed, i.e., endless circuit. The coolant in heat exchanger 99 after dumping its heat load to the feed water is returned via pipe 110 and transfer pump 108 to the cooling jacket 52. To minimize heat loss, the entire head and block of the engine including the manifolds 40, 42, and 80 can be enclosed in a layer of thermal insulation 115 of any suitable commercially available grade which is shown covering only certain parts of the engine to enable other parts to be seen.

An important feature of the preferred embodiment of the present invention is a provision for running the engine hot, so as to maintain a high temperature differential between the coolant and the feed water. This enables the invention to recover coolant energy that would otherwise be wasted. To accomplish this, the cooling jacket temperature is intentionally raised and maintained at a temperature substantially above the temperature of coolant in common practice (often about 180° F. to 200° F.). A non-aqueous coolant is used that has a boiling point significantly greater than that of water. Even a minor amount of water in the non-aqueous coolant will have the potential of causing damage by creating vapor bubbles on the inside surface of the cylinder head that are capable of producing transition film boiling where vapor collects in pockets that become trapped on metal surfaces causing damaging hot spots to develop. The coolant should also have a viscosity that promotes good flow characteristics as well as providing good thermal conductivity. One preferred coolant is a mono or polyhydric alcohol having a boiling point of over 212° F. and most preferably over 225° F. Among such coolants are lower alcohols, amyl alcohols, the glycols and glycerol. One preferred coolant is anhydrous propylene glycol B.P. 375° F. As long as no water is present, sustained engine operation can be maintained using propylene glycol at temperatures of 300° F. and above without the formation of vapor pockets or transition film boiling, and therefore, without the development of dangerous hotspots around the combustion chamber and spark plug. Consequently, the engine 10 can be safely operated without damage with the coolant 36 at a sustained temperature of 300° F. as it flows to heat exchanger 99.

Fluid circulation by pump 28 provides a fluid perturbation circuit entirely within the engine block and head, i.e., liquid is picked up in the block and expelled back into the block to ensure and maintain a current of fluid that is both laminar and circular or helical as well as at a rate which is typically higher than that through the heat exchanger 99 outside the jacket 52 so as to ensure engine reliability, uniform cooling around the cylinders 18-21 and the disruption of transition film boiling which can lead to possible engine damage. The loop through the manifolds 40, 42 and 80, the intrajacket circulation pump 28 and the jacket 52 entirely within the engine 10 comprising the intrajacket recirculation and perturbation circuit, starts and ends in the jacket 52 so as to transfer coolant 36 from one part of the jacket to another part with the assurance of a positive flow to achieve perturbation at any selected rate sufficient to displace and dispel any vapor pockets that may begin to form. Most preferably, no entry or egress of coolant outside the engine is permitted between the pump 28 and any of the manifolds 40, 42 or 80. This prevents undesired flow, for example, from pump 108 or line 110, etc., into or out of pump 28 that might interfere with the intrajacket vapor pocket perturbation flow. The flow of coolant outside of the jacket 52 viz, to the heat exchanger 99 and back to the jacket 52 is thus a separate circuit that cannot reduce or interrupt the intrajacket circulation controlled by the motor 27 and pump 28. In a typical operating regimen in accordance with the invention, the speed of pump 108 is regulated by the controller 305 or the same thing is done with coolant flow control thermostatic valve (not shown) to keep the temperature of the coolant as high as possible at all times under varying engine operating conditions without causing engine damage or boiling the coolant. The speed of pump 28 or flow valve for pump 28 is regulated by controller 305 to increase the flow rate to a level sufficient to prevent coolant vaporization or hot spots from developing around the combustion chamber.

The helical or circular coolant pathway provided by guides 57, 59 and 63a greatly improves mass velocity and increase the effective heat transfer of coefficient. It is also important to note that the invention disperses the coolant in a multi-channel flow path in an engine circuit separate from that outside the engine which consists of a plurality of vertically disposed laterally distributed channels each starting at the lower end of each cylinder instead of merely introducing the coolant at one point in the jacket 52 and removing it at another single point. In this way the coolant is introduced by pump 28 at several points in the jacket 52 as well as being removed at several points in the jacket so as to achieve a vertical multi-channel laminar flow at the lower part of each cylinder that is distributed, i.e., spread in a sheet-like manner across a wide area inside the jacket flowing toward lower ends of the combustion chambers to enhance heat transfer while also virtually eliminating any form of boiling including nucleate boiling throughout while entirely preventing the possibility of transition film boiling which, if present could produce a runaway heating condition that is capable of leading to engine damage. The laminar and helical flow of coolant around the combustion chambers and circular flow on top of the cylinders is shown in FIGS. 1, 1A and throughout the length of the engine in FIG. 3.

In the preferred form of the invention, the intrajacket perturbation circuit maintains the coolant flowing through manifolds 40, 42 and 80 at all times in heat conductive relationship with the greater mass of the coolant in the jacket 52 as opposed to transferring the coolant through a pipe outside of and separate from the jacket 52. This is accomplished by making the passages or ducts leading to and from the circulation pump 28 a part of the jacket 52 itself as by providing the multi-channel casting as shown and described above wherein the jacket cavity 52 which contains the coolant that is in contact with the cylinders 18-21 is also in thermal contact with the channels 40, 42, and 80 leading to and from the pump 28 thereby simplifying manifold construction while at the same time reducing heat loss. The thermal insulation layer 115 which encloses the engine including coolant manifolds 40, 42, and 80 provides further protection against the heat loss.

Figure 4:
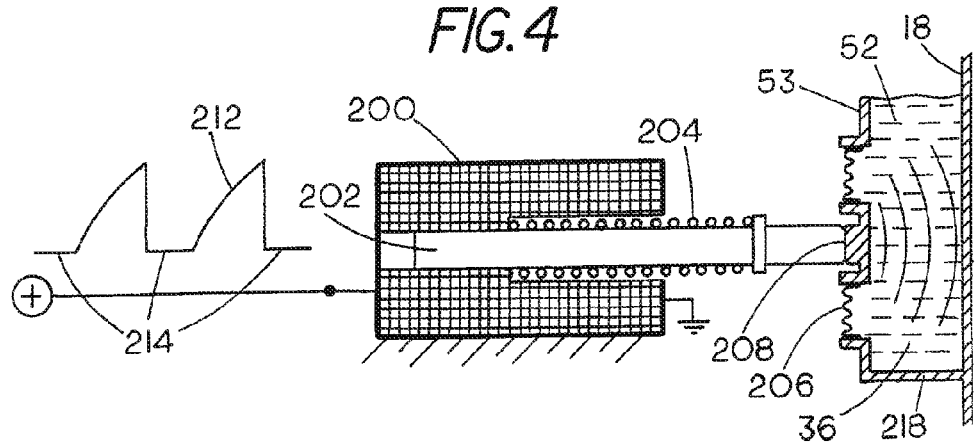
FIG. 4 is a diagrammatic vertical sectional view of a modified form of perterbating device.

An optional alternative form of perturbation device which provides cyclic perturbation 45 shown in FIG. 4 has no manifolds or pump but instead comprises an electrical solenoid 200 with a reciprocating iron armature 202 yieldably biased toward the right by compression spring 204 into contact with one end of a perturbation plunger 208 that is mounted in a flexible diaphragm 206 in the wall 53 of the cooling jacket 52. Plunger 208 can be biased toward the left by a compression spring (not shown). The diaphragm has a peripheral circle of corrugations to provide flexibility.

During operation of FIG. 4, a variable electrical waveform such as a sawtooth form 212 separated by zero current segments at 214 is supplied to solenoid 200 causing the armature 202 to be repeatedly retracted so as to store energy in the spring and then when the current is cut off at 214, it is forced by spring 204 to strike plunger 208 at any selected cyclic frequency typically 5-30 Hz. The impacts create shock waves that emanate from the plunger 206 and pass outwardly at the speed of sound as high energy level perturbations through the coolant imparting acceleration to any steam bubbles that may begin to form so as to disrupt and disintegrate them at the heated surfaces 18 and 218 before they can coalesce into enlarged steam pockets on the heated surface known as a transition film which would prevent heat transfer and allow a runaway heating condition to develop that could cause damage to the engine.

Example 1

A one cylinder I.C. engine having a bore of 96 mm and a stroke of 78 mm was tested and found at 5994 rpm to produce a coolant flow of 4330 lb/hr which translated into an energy transfer rate of 27022 Btu/hr (ΔT of 6.24° F.). With an eight percent steam cutoff as a fraction of the steam power stroke, the combustion exhaust gases in generator 104 were sufficient to sustain a water evaporation rate of 313 lb/hr for steam at 800° F. and 800 psia, The pumps 28 and 108 and/or a coolant thermostat (not shown) are intentionally regulated by the central engine management computer 305 (FIG. 1) to raise the coolant temperature to 250° F. The feed water in tank 109 is at 200° F. Using a heat exchanger 99 that is able to provide an efficiency of 80% so as to heat the feed water to 240° F. (200° F.+80% of 50° F.), the heat absorbed from coolant equals 40° F.×313 lb/hr or 12520 Btu/fir which amounts to about 46% (12520÷27022) of the coolant heat having been transferred to feed water. The remainder is returned to the cooling jacket for reheating. Exhaust gases provided an additional 74600-80000 Btu/hr to the steam generator 104.

Example 2

In a second run otherwise similar to Example 1 at 2996 rpm, coolant flow was 2646 lb/hr that translated to an energy transfer rate of 34148 Btu/hr (ΔT of 12.9° F.). Exhaust gas provided sufficient heat for the superheater 104 to sustain an indicated water evaporation rate of 156 lb/hr. Heated by coolant at 300° F. in a heat exchanger 99 of 80% efficiency to 280° F. (200+80% of 100° F.), the 200° F. feed water absorbs 80°

F.×156 lb/hr or 12480 Btu/hr which is about 36% (12480÷34148) of the coolant heat. The exhaust gases in this run provided another 28000-33000 Btu/hr to the steam generator 104.

All publications and patents cited herein are incorporated by reference to the same extent as if each individual publication or patent were specifically and individually reproduced herein and indicated to be incorporated by reference.

Many variations of the invention within the scope of the appended claims will be apparent to those skilled in art once the principles described herein are understood.

What is claimed is:

1. A combined internal combustion and Rankine cycle engine for recovering waste combustion heat comprising,
    at least one cylinder having a combustion piston slidably and sealingly mounted therein between a combustion chamber and a steam expansion chamber,
    the combustion chamber being outward of the piston and including a combustion intake valve and a combustion exhaust valve communicating therewith,
    the steam expansion chamber being located in the cylinder inward of the piston,
    at least one steam inlet valve enclosed by the piston and connected to be operated in timed relationship to the piston movement for admitting steam produced by waste combustion heat into the steam expansion chamber through a fixed cylinder cap that is sealingly and slidingly mounted within the piston,
    at least one steam exhaust port communicating with the expansion chamber to exhaust steam therefrom,
    a cooling jacket at least partially surrounding the combustion chamber,
    a helical flow guide comprising a spiral flange in the cooling jacket for causing a coolant to flow therethrough in a circuitous pathway wherein the coolant flows in a convoluted or winding course within the cooling jacket while in thermal contact with the combustion chamber whereby a mass velocity of the coolant is increased through at least one flow channel to thereby increase a net heat transfer coefficient between the combustion chamber cooling jacket and the coolant,
    a pump for transferring coolant between a portion of the cooling jacket adjacent the cylinder and a cylinder head cooling jacket for cooling the combustion chamber,
    a heat exchange coupling between the coolant and the steam or a steam condensate to transfer heat thereto from the coolant, and
    a duct connected to transfer the condensate to a heater fired by exhaust gases from the combustion chamber for providing steam produced from the condensate to the steam expansion chamber.

2. The apparatus of claim 1
    wherein the cooling jacket surrounds the cylinder
    wherein the cooling jacket includes an upper portion and a lower portion, and the pump is connected thereto to pump the coolant from the lower portion to the upper portion
    wherein the upper portion of the cooling jacket comprises the circuitous pathway through the helical flow guide wherein the spiral flange extends radially outward from the cylinder to direct the flow of coolant to encircle the combustion chamber in a spiral pathway proximate an upper portion of the cylinder
    such that the heated coolant flows around the upper portion of the cylinder then through a cooling jacket within a cylinder head of the engine.

3. The engine of claim 1 including a guide within a cylinder head to impart a swirling motion to the coolant within the head and a coolant outlet in the head communicating with the cooling jacket to transfer the coolant out of the head for heating the steam condensate.

4. A combined internal combustion and Rankine cycle engine for recovering waste combustion heat comprising,
    at least one cylinder having a combustion piston slidably and sealingly mounted therein at one end of a combustion chamber and said engine having a steam expansion chamber,
    the combustion chamber being outward of the piston and including a combustion intake valve and a combustion exhaust valve communicating therewith,
    the steam expansion chamber being located in a cylinder of the engine,
    at least one steam inlet valve connected to be operated in timed relationship to the piston movement for admitting steam produced by waste combustion heat into the steam expansion chamber through a fixed cylinder head as a part of the engine,
    a steam exhaust valve connected for exhausting steam from the steam expansion chamber,
    a cooling jacket at least partially surrounding a cylinder,
    a pump connected to the cooling jacket to cause the coolant to flow therethrough in a coolant perturbation pathway inside the engine comprising an endless intrajacket circuit that is independent of coolant flow outside of the cooling jacket,
    a second pump for transferring coolant from the cooling jacket through a second circuit outside of the cooling jacket to a heat exchange coupling between the coolant and a steam condensate to transfer heat to the steam condensate from the coolant and
    a steam generator fired by waste combustion gas connected to further heat the steam condensate to provide steam for the steam expansion chamber.

5. The engine of claim 4 wherein the steam exhaust valve is a phase controlled exhaust valve that communicates with the steam expansion chamber for varying a recompression of residual steam remaining in the steam expansion chamber to thereby regulate the final pressure of the recompressed steam.

6. The engine of claim 4 including a fuel burner which comprises a source of supplemental heat that is separate from the combustion chamber and is connected to heat the steam or condensate thereof whereby a portion of Rankine cycle thermal energy is provided by waste heat from the internal combustion cycle and a second portion of the Rankine cycle thermal energy is operatively connected to be supplied by the fuel burner.

7. A combined internal combustion and Rankine cycle engine for recovering waste combustion heat comprising,
    at least one cylinder having a combustion piston slidably and sealingly mounted therein at one end of a combustion chamber that comprises a first thermodynamic cycle of energy conversion and said engine having an expansion chamber for steam comprising a second thermodynamic cycle of energy conversion,
    the combustion chamber being outward of the piston and including a combustion intake valve and a combustion exhaust valve communicating therewith,
    the steam expansion chamber is located in at least one of the cylinders in communication with the piston of the at least one of the cylinders,
    at least one steam exhaust port and at least one steam inlet valve to power the piston of the at least one of the cylinders by admitting steam produced by waste combustion heat from the combustion chamber into the steam expansion chamber through the steam inlet valve as a part of the engine, a cooling jacket for the first thermodynamic cycle in thermal transfer relationship with the combustion chamber, a liquid non-aqueous coolant contained in a cooling jacket circuit of the first thermodynamic cycle is interposed as a thermal interface between the first and the second thermodynamic cycles of energy conversion to transfer heat from the cooling jacket to a heat exchange coupling between the liquid non-aqueous coolant and the steam or a condensate of the steam from the steam expansion chamber to thereby heat the steam or condensate.

8. The engine of claim 7 wherein the two different thermodynamic cycles of energy conversion are (a) at least one of an Otto, Atkinson, two-stroke or Diesel cycle and (b) a Rankine cycle.

9. The engine as in claim 1, 2, 3 or 7 wherein the cooling jacket has an intrajacket coolant perturbation pump which circulates coolant in an endless circuit that is contained within the cooling jacket thereof.

10. The engine of claim 9 wherein the endless circuit contained in the cooling jacket includes coolant ductwork as a part of a cylinder block or a cylinder head of the engine and the ductwork is in thermal transfer relationship with the coolant in the cooling jacket.

11. A high efficiency method of operating a dual internal combustion and Rankine cycle engine to recover waste heat and having at least one cylinder, said engine containing a combustion chamber and a steam expansion chamber with a piston slidably and sealingly mounted for reciprocation therein comprising the steps of, providing a fixed steam cylinder head mounted as a part of the engine, providing a cooling jacket in thermal transfer relationship with a combustion chamber, providing a non-aqueous liquid coolant that has a boiling point of at least 225° F. in the cooling jacket of the combustion chamber, transferring the non-aqueous coolant from the cooling jacket to a heat exchanger circuit for heating steam or a steam condensate and thereby recovering waste heat from the combustion chamber while maintaining the coolant thus transferred above 212° F., transferring the heated steam or the condensate thereof through a steam generator fired by waste combustion gases from the combustion chamber that supplies additional heat to the steam or the condensate which is then transferred to the steam expansion chamber, such that the non-aqueous liquid coolant serves as a thermal interface between two thermodynamic cycles of energy conversion comprising (a) at least one of an Otto, Atkinson, two-stroke or Diesel cycle and (b) the Rankine cycle.

12. The method of claim 11 including the step of providing an endless intrajacket coolant flow perturbation circuit in the engine that is contained within the cooling jacket and comprises a circuit that is separate from the heat exchanger circuit to help reduce or eliminate transition film boiling of the coolant in the cooling jacket.

13. The method of claim 12 wherein a flow rate of the heat exchanger circuit and a flow rate of the intrajacket perturbation circuit are arranged to maintain the temperature of the coolant at 225° F. or more within the cooling jacket while reducing or preventing transition film boiling from producing hotspots in the engine.

14. The method of claim 11 including a step of agitating the coolant in the cooling jacket by inducing sonic impulses or shock waves to pass therethrough to provide sufficient perturbation of the coolant to reduce or eliminate hotspots within the cooling jacket.

15. The method of claim 13 wherein the arrangement of the circuits comprises maintaining the heat exchanger circuit flow at a rate sufficient to keep the coolant temperature at 225° F. or above and the endless intrajacket perturbation circuit flow rate is sufficient to reduce or prevent transition film boiling from producing hot spots around the combustion chamber.

16. A combined internal combustion and Rankine cycle engine for recovering waste combustion heat comprising, at least one cylinder having a combustion piston slidably and sealingly mounted therein at one end of a combustion chamber and said engine having a steam expansion chamber for a working fluid, the combustion chamber being outward of the piston and including a combustion intake valve and a combustion exhaust valve, the steam expansion chamber being located in at least one of the cylinders in communication with the piston thereof, a steam inlet valve for injecting steam to power the piston of the steam expansion chamber and connected to be operated in timed relationship to piston movement for admitting steam from a steam supply produced by waste combustion heat from the combustion chamber into the steam expansion chamber through a fixed cylinder cap, a steam exhaust valve having an exhaust port for discharging steam from the steam expansion chamber, a connecting rod which is moveable along a central longitudinal axis of at least one of the cylinders is operatively connected between the piston thereof and a crankshaft and is disposed for movement in a space between the cylinder cap and the crankshaft, the steam supply including a heater connected to the combustion exhaust valve to receive exhaust gas therefrom to heat the working fluid for injection through the steam inlet valve into the steam expansion chamber, and a fuel burner comprising a source of supplemental heat that is separate and independent of the combustion chamber and is operatively connected to supply heat to the working fluid so as to provide a portion of the Rankine thermal energy input from a source that is external to the heat energy from the combustion chamber exhaust gas.

17. The combined internal combustion and Rankine cycle engine of claim 16 wherein the heater is a steam generator and the fuel burner is connected as a part of the steam generator.

18. The combined internal combustion and Rankine cycle engine of claim 16 wherein the fuel burner is a standby heater for supplying supplemental Rankine thermal energy to the steam for adapting to changing conditions of operation.

19. The combined internal combustion and Rankine cycle engine of claim 16 wherein the fuel burner is connected to add heat to the working fluid following heating thereof by the heater.

20. The method of claim 11 including
providing a fuel burner that is separate from the combustion chamber and is connected to heat the steam and,
arranging said fuel burner to produce a portion of the Rankine thermal energy input that is external to energy from the waste combustion chamber exhaust gas.

21. The combined internal combustion and Rankine cycle engine of claim 4 including a coolant flow guide in the cooling jacket causing the coolant to flow in a circuitous path while in thermal contact with the cylinder having the piston therein.

22. The combined internal combustion and Rankine cycle engine of claim 7 including a coolant flow guide in the cooling jacket causing the coolant to flow in a circuitous path while in thermal contact with the cylinder having the piston therein.

23. A method of recovering waste heat in a dual Rankine cycle and internal combustion piston engine comprising the steps of,
providing at least one cylinder having a piston slidably and sealingly mounted therein and a cylinder head with an internal combustion chamber therebetween, the engine also having a steam expansion chamber in at least one of the cylinders that is operatively associated with a piston therein, wherein each piston is operatively connected to a crankshaft;
providing the internal combustion chamber with a cooling jacket that at least partially surrounds the combustion chamber;
providing a heater fired by combustion products from the internal combustion chamber;
providing a Rankine working fluid in a circuit that passes through the heater, followed by a Rankine cycle expansion in the steam expansion chamber and thereafter through a condenser to form a condensate;
providing a non-aqueous coolant that has a boiling point which is above the boiling point of the working fluid;
heating the non-aqueous coolant in the cooling jacket of the combustion chamber to a temperature that is above the boiling point of the working fluid but is below the boiling point of the coolant;
circulating the heated non-aqueous coolant as a thermal interface between two thermodynamic cycles, of energy conversion comprising the internal combustion cycle and the Rankine cycle to thereby heat the Rankine working fluid in a first heating stage; and
thereafter passing the working fluid through the heater fired by combustion exhaust gas from the combustion chamber.

24. The method of claim 23 wherein the non-aqueous coolant in the cooling jacket is caused to flow in a circuitous path while in thermal contact with the cylinder having the combustion chamber therein.

25. The method as in claim 23 including the steps of circulating the coolant in the cooling jacket to flow in an endless course located inside the cooling jacket that is independent of circulation through said circuit.

26. The method of claim 23 including the steps of burning a fuel as a source of supplemental thermal energy that is separate from the combustion chamber and
supplying the supplemental thermal energy to the working fluid to thereby provide more power.

27. The engine of claim 16 wherein the steam exhaust valve is constructed and arranged to close proximate an end of an exhaust stroke and wherein a clearance between the piston and the fixed cylinder cap of a minor fraction of an inch is provided that is sufficient to keep the piston from striking the cylinder cap.

28. The method of claim 23 including the steps of:
enabling residual steam to escape through the steam exhaust valve by closing the steam exhaust valve proximate an end of an exhaust stroke, and
providing a small clearance space between the piston and the cylinder head that is sufficient to prevent thermal expansion from enabling the piston to strike the cylinder head.

* * * * *